United States Patent
Roper et al.

(10) Patent No.: US 6,480,131 B1
(45) Date of Patent: Nov. 12, 2002

(54) MULTIPLE DIE INDUSTRIAL PROCESS CONTROL TRANSMITTER

(75) Inventors: Weston R. Roper, St. Louis Park; David G. Tyson, Eden Prairie; Brian L. Westfield, Victoria; Michael J. Gaboury, Burnsville, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/636,152

(22) Filed: Aug. 10, 2000

(51) Int. Cl.$^7$ ................................................ H03M 1/12
(52) U.S. Cl. ........................ 341/155; 341/118; 341/119; 341/156
(58) Field of Search ................................. 341/155, 156, 341/110, 137, 116, 120, 143, 119, 115, 118, 114, 176

(56) References Cited

U.S. PATENT DOCUMENTS

| | | | |
|---|---|---|---|
| 3,701,280 A | 10/1972 | Stroman | 73/194 |
| 3,968,694 A | 7/1976 | Clark | 73/398 |
| 4,120,206 A | 10/1978 | Rud, Jr. | 73/718 |
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/510 |
| 4,602,344 A | 7/1986 | Ferretti et al. | 364/509 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | * 11/1988 | Frick | 340/870.37 |

(List continued on next page.)

FOREIGN PATENT DOCUMENTS

| | | |
|---|---|---|
| DE | 34 41 648 A1 | 12/1987 |
| DE | 91 09 176.4 | 10/1991 |
| DE | 197 45 244 A1 | 4/1998 |

(List continued on next page.)

OTHER PUBLICATIONS

U.S. patent application Ser. No. 09/862,762, Wang, filed May 21, 2001.

(List continued on next page.)

Primary Examiner—Michael Tokar
Assistant Examiner—John Nguyen
(74) Attorney, Agent, or Firm—Westman, Champlin & Kelly, P.A.

(57) ABSTRACT

A two-wire industrial process control transmitter includes a sensor, at least two integrated circuits, and a level shift circuit. The first integrated circuit contains the analog measurement circuit that includes a sensor detection circuit and the analog portion of a digital-to-analog convertor. The second integrated circuit contains the digital system circuit that includes a modem and the digital portion of the analog-to-digital convertor. The first and second ICs may be powered at different voltage levels to maximize the power of the analog circuit and improve resolution. Alternatively, the ICs may be powered at the same voltage level, but the digital circuits are divided among several stacked dies to minimize the voltage for each digital circuit. In either case, the level shifting circuit shifts the voltage level between the analog and digital circuits.

17 Claims, 6 Drawing Sheets

U.S. PATENT DOCUMENTS

| | | | |
|---|---|---|---|
| 4,791,352 A | 12/1988 | Frick et al. ................... 324/60 |
| 4,798,089 A | 1/1989 | Frick et al. ................... 73/706 |
| 4,818,994 A | 4/1989 | Orth et al. ............. 340/870.21 |
| 4,825,704 A | 5/1989 | Aoshima et al. ......... 73/861.42 |
| 4,833,922 A | 5/1989 | Frick et al. ................... 73/756 |
| 4,850,227 A | 7/1989 | Luettgen et al. ............. 73/708 |
| 4,866,989 A | 9/1989 | Lawless ....................... 73/756 |
| 4,881,412 A | 11/1989 | Northedge ............... 73/861.04 |
| 4,930,353 A | 6/1990 | Kato et al. ................... 73/727 |
| 4,958,938 A | 9/1990 | Schwartz et al. ........... 374/208 |
| 4,970,898 A | 11/1990 | Walish et al. ................. 73/706 |
| 4,980,675 A | 12/1990 | Meisenheimer, Jr. ....... 340/626 |
| 5,000,047 A | 3/1991 | Kato et al. ................... 73/706 |
| D317,266 S | 6/1991 | Broden et al. ............... D10/46 |
| D317,269 S | 6/1991 | Selg ............................. D10/52 |
| D318,432 S | 7/1991 | Broden et al. ............... D10/46 |
| 5,028,746 A | 7/1991 | Petrich ................. 191/12.2 R |
| 5,035,140 A | 7/1991 | Daniels et al. ................ 73/290 |
| 5,058,437 A | 10/1991 | Chaumont et al. ....... 73/861.21 |
| 5,060,108 A | 10/1991 | Baker et al. ................. 361/283 |
| 5,070,732 A | 12/1991 | Duncan et al. ............... 73/431 |
| 5,083,091 A | 1/1992 | Frick et al. ................. 324/678 |
| 5,087,871 A | 2/1992 | Losel ......................... 323/299 |
| 5,094,109 A | 3/1992 | Dean et al. ................... 73/718 |
| D329,619 S | 9/1992 | Cartwright ................... D10/52 |
| 5,142,914 A | 9/1992 | Kusakabe et al. ............. 73/723 |
| 5,157,972 A | 10/1992 | Broden et al. ................. 73/718 |
| 5,162,725 A | 11/1992 | Hodson et al. ............. 324/115 |
| 5,187,474 A * | 2/1993 | Kielb et al. ............. 340/870.18 |
| 5,212,645 A | 5/1993 | Wildes et al. ............... 364/463 |
| 5,227,782 A | 7/1993 | Nelson ................. 340/870.11 |
| 5,236,202 A | 8/1993 | Krouth et al. .............. 277/164 |
| 5,245,333 A * | 9/1993 | Anderson et al. ........ 340/870.3 |
| 5,248,167 A | 9/1993 | Petrich et al. ................. 285/23 |
| D342,456 S | 12/1993 | Miller et al. ................. D10/60 |
| 5,287,746 A | 2/1994 | Broden ....................... 73/706 |
| 5,353,200 A | 10/1994 | Bodin et al. ................. 361/816 |
| 5,369,386 A | 11/1994 | Alden et al. ................ 335/206 |
| 5,377,547 A | 1/1995 | Kusakabe et al. ............. 73/723 |
| 5,381,355 A | 1/1995 | Birangi et al. .......... 364/724.01 |
| D358,784 S | 5/1995 | Templin, Jr. et al. ........ D10/96 |
| 5,436,824 A | 7/1995 | Royner et al. ................. 363/89 |
| 5,448,180 A | 9/1995 | Kienzler et al. ............. 326/15 |
| 5,469,150 A | 11/1995 | Sitte ....................... 340/825.07 |
| 5,471,885 A | 12/1995 | Wagner ................. 73/862.041 |
| D366,000 S | 1/1996 | Karas et al. ................. D10/60 |
| D366,218 S | 1/1996 | Price et al. ................... D10/52 |
| 5,495,768 A | 3/1996 | Louwagie et al. ............ 73/706 |
| 5,498,079 A | 3/1996 | Price .......................... 374/208 |
| 5,524,333 A | 6/1996 | Hogue et al. ................. 29/593 |
| 5,524,492 A | 6/1996 | Frick et al. ................... 73/706 |
| 5,546,804 A | 8/1996 | Johnson et al. ............... 73/431 |
| 5,600,782 A | 2/1997 | Thomson ............... 395/182.02 |
| 5,606,513 A | 2/1997 | Louwagie et al. .......... 364/510 |
| 5,650,936 A | 7/1997 | Loucks et al. .............. 364/483 |
| 5,656,782 A | 8/1997 | Powell, II et al. ............ 73/756 |
| 5,665,899 A | 9/1997 | Willcox ...................... 73/1.63 |
| 5,668,322 A | 9/1997 | Broden ........................ 73/756 |
| 5,670,722 A | 9/1997 | Moser et al. ................. 73/756 |
| 5,710,552 A * | 1/1998 | McCoy et al. ......... 340/870.21 |
| 5,717,385 A | 2/1998 | Kogure ................. 340/825.07 |
| 5,754,596 A | 5/1998 | Bischoff et al. ............ 375/295 |
| 5,764,928 A | 6/1998 | Lancott ....................... 395/285 |
| 5,823,228 A | 10/1998 | Chou ........................... 137/597 |
| 5,870,695 A | 2/1999 | Brown et al. ............... 702/138 |
| 5,899,962 A | 5/1999 | Louwagie et al. .......... 702/138 |
| 5,920,016 A | 7/1999 | Broden ........................ 73/756 |
| 5,948,988 A | 9/1999 | Bodin .......................... 73/706 |
| 5,954,526 A | 9/1999 | Smith ......................... 439/136 |
| 5,955,684 A | 9/1999 | Gravel et al. ............... 73/866.5 |
| 5,963,147 A | 10/1999 | Westfield et al. ...... 340/870.11 |
| 5,973,942 A | 10/1999 | Nelson et al. ................. 363/21 |
| 5,988,203 A | 11/1999 | Hutton ....................... 137/597 |
| 6,005,500 A * | 12/1999 | Gaboury et al. ............... 341/43 |
| 6,006,338 A * | 12/1999 | Longsdorf et al. .......... 713/340 |
| 6,038,927 A | 3/2000 | Karas ......................... 73/706 |
| 6,050,145 A | 4/2000 | Olson et al. .................. 73/706 |
| 6,059,254 A | 5/2000 | Sundet et al. ............... 248/678 |
| 6,105,437 A | 8/2000 | Klug et al. ................... 73/756 |
| 6,111,888 A | 8/2000 | Green et al. ................. 370/461 |
| 6,115,831 A | 9/2000 | Hanf et al. .................. 714/43 |
| 6,123,585 A | 9/2000 | Hussong et al. ............. 439/652 |
| 6,140,952 A | 10/2000 | Gaboury ..................... 341/143 |
| D439,177 S | 3/2001 | Fandrey et al. |
| D439,178 S | 3/2001 | Fandrey et al. |
| D439,179 S | 3/2001 | Fandrey et al. |
| D439,180 S | 3/2001 | Fandrey et al. |
| D439,181 S | 3/2001 | Fandrey et al. |
| 6,216,172 B1 | 4/2001 | Kolblin et al. .............. 709/253 |
| D441,672 S | 5/2001 | Fandrey et al. |
| 6,233,532 B1 | 5/2001 | Boudreau et al. ............. 702/89 |
| 6,285,964 B1 | 9/2001 | Babel et al. ................ 702/121 |

FOREIGN PATENT DOCUMENTS

| | | |
|---|---|---|
| DE | 299 03 260 U1 | 5/2000 |
| EP | 0 063 685 A1 | 11/1982 |
| EP | 0 167 941 A2 | 1/1986 |
| EP | 0 214 801 A1 | 3/1987 |
| EP | 0 223 300 A2 | 5/1987 |
| EP | 0 268 742 A1 | 6/1988 |
| EP | 0 639 039 A1 | 2/1995 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 95/29433 | 2/1995 |
| WO | WO 96/34264 | 10/1996 |
| WO | WO 98/48489 | 10/1998 |
| WO | WO 00/23776 | 4/2000 |

OTHER PUBLICATIONS

U.S. patent application Ser. No. 09/867,961, Fandrey et al., filed May 30, 2001.

U.S. patent application Ser. No. 09/671,495, Behm et al., filed Sep. 27, 2000.

U.S. patent application Ser. No. 09/519,781, Neslon et al., filed Mar. 7, 2000.

U.S. patent application Ser. No. 09/520,292, Davis et al., filed Mar. 7, 2000.

U.S. patent application Ser. No. 09/519,912, Nelson et al., filed Mar. 7, 2000.

U.S. patent application Ser. No. 09/672,338, Nelson et al., filed Sep. 28, 2000.

U.S. patent application Ser. No. 09/638,181, Roper et al., filed Jul. 31, 2000.

U.S. patent application Ser. No. 09/571,111, Westfield et al., filed May 15, 2000.

U.S. patent application Ser. No. 09/564,506, Nord et al., filed May 4, 2000.

U.S. patent application Ser. No. 09/667,289, Westfield et al., filed Sep. 22, 2000.

U.S. patent application Ser. No. 09/667,399, Behm et al., filed Sep. 21, 2000.

U.S. patent application Ser. No. 09/671,130, Fandrey et al., filed Sep. 27, 2000.

U.S. patent application Ser. No. 09/636,152, Rpoer et al., Aug. 10, 2000.

Product Data Sheet No.: 00813–0100–4378, "Model 751 Field Signal Indicator", by Rosemount Inc., Eden Prairie, Minnesota, (1997).

Product Data Sheet No.: 00813–0100–4731, "APEX™ Radar Gauge", by Rosemount Inc., Eden Prairie, Minnesota, (1998).

Product Data Sheet No.: 00813–0100–4640, "Model 3201 Hydrostatic Interface Unit", from the Rosemount Comprehensive Product Catalog, published 1998, by Rosemount Inc., Eden Prairie, Minnesota.

Product Data Sheet No.: 00813–0100–4003, "Model 8800A", by Rosemount Inc., Eden Prairie, Minnesota, (1998).

Product Data Sheet No.: 00813–0100–4773, "Model 8742C—Magnetic Flowmeter Transmitter with Foundation™ Fieldbus", from the Rosemount Comprehensive Product Catalog, published 1998, by Rosemount Inc., Eden Prairie, Minnesota.

"Rosemount Model 8732C Magnetic Flowmeter Transmitter", by Rosemount Inc., Eden Prairie, Minnesota, (1998).

Product Data Sheet No.: 00813–0100–4263, "Model 444 Alphaline® Temperature Transmitters", by Rosemount Inc., Eden Prairie, Minnesota, (1997).

Product Data Sheet No.: 00813–0100–4769, "Model 3244MV Multivariable Temperature Transmitter with Foundation™ Fieldbus", by Rosemount Inc., Eden Prairie, Minnesota, (1998).

Product Data Sheet No.: 00813–0100–4724, "Models 3144 and 3244MV Smart Temperature Transmitters", by Rosemount Inc., Eden Prairie, Minnesota, (1998).

Product Data Sheet No.: 00813–0100–4738, "Model 3095FB Multivariable™ Transmitter with Modbus™ Protocol", by Rosemount Inc., Eden Prairie, Minnesota, (1996, 1997).

Product Data Sheet No.: 00813–0100–4001, "Model 3051 Digital Pressure Transmitter for Pressure, Flow, and Level Measurement", by Rosemount Inc., Eden Prairie, Minnesota, (1998).

Product Data Sheet No.: 00813–0100–4698, "Model 2090F Sanitary Pressure Transmitter", by Rosemount Inc., Eden Prairie, Minnesota, (1998).

Product Data Sheet No.: 00813–0100–4690, "Model 2088 Economical Smart Pressure Transmitter", by Rosemount Inc., Eden Prairie, Minnesota, (1998).

Product Data Sheet No.: 00813–0100–4592, "Model 2024 Differential Pressure Transmitter", by Rosemount Inc., Eden Prairie, Minnesota, (1987–1995).

Product Data Sheet No.: 00813–0100–4360, "Model 1151 Alphaline® Pressure Transmitters", by Rosemount Inc., Eden Prairie, Minnesota, (1998).

Product Data Sheet No.: 00813–0100–4458, "Model 1135F Pressure–to–Current Converter", by Rosemount Inc., Eden Prairie, Minnesota, (1983, 1986, 1994).

"Single Chip Senses Pressure and Temperature," *Machine Design*, 64 (1992) May 21, No. 10.

Brochure, "Reduce Unaccounted–For Natural Gas with High–Accuracy Pressure Transmitters," Rosemount Inc. Measurement Division, Eden Prairie, Minnesota, ADS 3073, 5/91, pp. 1–4.

Technical Information Bulletin, "Liquid Level Transmitter Model DB40RL Sanitary Sensor deltapilot," Endress + Hauser, Greenwood, Indiana, 9/92, pp. 1–8.

"The Digitisation of Field Instruments" W. Van Der Bijl, *Journal A*, vol. 32, No. 3, 1991, pp. 62–65.

Specification Summary, "TELETRANS™ 3508–30A Smart Differential Pressure Transmitter," (undated) Bristol Babcock, Inc., Watertown, CT, 06795.

Specification Summary, "TELETRANS™ 3508–10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL FlushMount Hydrostatic Pressure Transmitter," Jul. 1992, Rosemount Inc., Eden Prairie, MN 55344.

"Flow Measurement," *Handbook of Fluid Dynamics*, V. Streeter, Editor–in–chief, published by McGraw–Hill Book Company, Inc. 1961, pp. 14–4 to 14–15.

"Precise Computerized In–Line Compressible Flow Metering," *Flow—Its Measurement and Control in Science and Industry*, vol. 1, Part 2, Edited by R. Wendt, Jr., Published by American Institute of Physics et al, (undated) pp. 539–540.

"A Systems Approach," Dr. C. Ikoku, *Natural Gas Engineering*, PennWell Books, (undated) pp. 256–257.

"Methods for Volume Measurement Using Tank–Gauging Devices Can Be Error Prone," F. Berto, *The Advantages of Hydrostatic Tank Gauging Systems*, undated reprint from *Oil & Gas Journal*.

"Hydrostatic Tank Gauging—Technology Whose Time Has Come," J. Berto, *Rosemount Measurement Division Product Feature*, undated reprint from *INTECH*.

"Pressure Sensors Gauge Tank Level and Fluid Density," *Rosemount Measurement Division Product Feature*, undated reprint from *Prepared Foods* (Copyright 1991 by Gorman Publishing Company).

"Low Cost Electronic Flow Measurement System," *Tech Profile*, May 1993, Gas Research Institute, Chicago, IL.

"Development of an Integrated EFM Device for Orifice Meter Custody Transfer Applications," S.D. Nieberle et al., *American Gas Association Distribution/Transmission Conference & Exhibit*, May 19, 1993.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering*, Dec. 1992, Bristol Babcock, Inc., Watertown, CT 06795.

"Smart Transmitters Tear Up The Market," C. Polsonetti, *INTECH*, Jul. 1993, pp. 42–45.

"MicroLAN Design Guide", Dallas Semiconductor, Tech Brief No. 1, (undated).

"Bosch CAN Specification Version 2.0", by Robert Bosch GmbH, pp. 1–68 including pp. –1– and –2–, (Sep. 1991).

Product Data Sheet No. 00813–0100–4001, "Digital Pressure Transmitter for Pressure, Flow, and Level Measurement", by Rosemount Inc., (1998).

"Claudius Ptolemy (100?–170? AD)", *M&C News*, 7 pages, (Apr. 1994).

American National Standard, "Hydraulic Fluid Power–Solenoid Piloted Industrial Valves–Interface Dimensions for Electrical Connectors", National Fluid Power Association, Inc., 10 pages, (Aug. 1981).

2 pages downloaded from http://www.interlinkbt.com/PRODUCT/IBT_PROD/DN/CN–DM_PN/EURO–D-P.HTM dated Sep. 15, 2000.

4 pages downloaded from http://www.interlinkbt.com/PRODUCT/IBT_PROD/dn/EUR–CON/euro–fwc.htm dated Sep. 15, 2000.

3 pages from TURK Cable Standards, by Turk, Inc., Minneapolis, Minnesota.

"Notification of Transmittal of the International Search Report or Declaration" for International application Ser. No. PCT/US00/26561.

"Notification of Transmittal of the International Search Report or Declaration" for International application Ser. No. PCT/US00/26488.

"Notification of Transmittal of the International Search Report or Declaration" for International application Ser. No. PCT/US00/26563.

"Notification of Transmittal of the International Search Report or Declaration" for International application Ser. No. PCT/US01/13993.

* cited by examiner

MULTIPLE DIE INDUSTRIAL PROCESS CONTROL TRANSMITTER

BACKGROUND OF THE INVENTION

This invention relates to the process control industry, and particularly to a two-wire industrial process control transmitter having improved resolution without increased power requirements.

An industrial process control transmitter is a transducer that responds to a process variable and provides a standardized transmission signal that is a function of the measured variable. The term "process variable" refers to a physical or chemical state of matter or conversion of energy. Examples of process variables include pressure, temperature, flow, conductivity, pH and other properties. Pressure is considered a basic process variable because it is used for the measurement of flow (difference of two pressures), level (head or backpressure), and temperature (fluid pressure in a thermal system). Industrial process pressure transmitters are used in industrial processes, such as slurries, liquids, vapors and gasses in chemical, pulp, petrochemical, gas, pharmaceutical, food and other fluid processing plants.

Many industrial process pressure transmitters are capacitor pressure transmitters that include at least two capacitor sensors formed by a deflectable sensing diaphragm and at least two capacitor electrodes, one on each side of the diaphragm. The conductive membrane deflects in response to unequal pressure applied to opposite sides of the diaphragm, the amount of deflection being based on the pressure difference. A dielectric fill-fluid fills the space between the capacitor electrodes and the diaphragm. The capacitance value of each capacitor sensor changes inversely with the distance between the respective capacitor electrode and the diaphragm. Thus the capacitances of both capacitor sensors change as the diaphragm deflects in response to applied pressures.

A charge circuit provides electrical charges to the capacitor electrodes. The charge on each capacitor is a function of the distance between the respective capacitor electrode and the conductive diaphragm, and hence is a function of the process variable being measured. The transmitter electronics includes an analog measurement circuit that measures the charge on the capacitors, an analog-to-digital converter that converts the analog signal from the measurement circuit to a binary signal, and a digital system circuit that converts the binary signal to a standardized signal for transmission to a central or control station via a two-wire communication loop. The analog measurement circuit is designed to produce an analog signal having a current that varies between 4 and 20 milliamperes (mA) over a selected pressure span of the transmitter.

Capacitor pressure transmitters are manufactured to operate within specific pressure ranges, identified by an upper range limit (URL). A pressure transmitter might, for example, have an operating range of 0 to 1,000 pounds per square inch (psi), and thus a URL of 1,000 psi. A span selection circuit selects a specific pressure range over which the 4 to 20 mA current spans within the range of the transmitter. For example, the transmitter having the URL of 1,000 psi might be operated in an environment to measure pressure span between 0 and 150 psi. The span selection circuit adjusts the detection circuit so that the maximum current (20 mA) represents the upper limit of the span, such as 150 psi for a span of 0–150 psi. The span selection circuit is adjustable to permit operation of the transmitter over several pressure spans between a minimum span and a maximum span. The maximum span includes the URL as the upper limit, whereas the minimum span is the smallest span to which the span selection circuit is adjustable. The "rangeability" of the transmitter is the ratio of the maximum span to the minimum span. Thus, the transmitter having the URL of 1,000 psi and a minimum span of 0 to 67 psi has a rangeability of 1000 to 67, or 15:1.

Industrial process control transmitters are manufactured to measure pressure over various ranges and with various URLs. It is cost effective to manufacture a given model of transmitter with various URLs so that many of the transmitter parts and much of the assembly are common for the various models of the transmitter. However, the several versions of each model differ from each other due to different URLs. These versions differ from each other primarily in the construction of seals, the fill-fluid employed in the capacitor sensor, and in differences in the measurement and charge circuits. For example a Model 1151 Pressure Transmitter available from Rosemount Inc. of Eden Prairie, Minn. is available in eight different versions having URLs between 1.082 and 6,000 psi. Manufacturing costs associated with eight different versions of this transmitter could be reduced by reducing the number of ranges.

To reduce the number of models of a transmitter that are manufactured, the rangeability of the transmitter must be increased to permit selection of smaller spans. Increased rangeability requires high resolution measurement circuits.

One limiting factor on resolution resides in the power available for the transmitter circuits. Most transmitters draw power from the communication loop and are designed to draw no more than 3 milliamperes (mA) and consume no more than 18 milliwatts (mW). Present transmitter circuits employ measurement electronics that operate at 4.3 volts consuming 1.3 mA of current to produce an analog measurement signal between 4 and 20 $\mu$A. The digital system electronics operate at 3.0 volts consuming. 1.7 mA of current. Thus, the transmitter draws the maximum 3 mA of current, and consumes 10.7 mW of power. At these levels, the resolution of the transmitter is about 18 bits. A reduction of the number of sensor ranges by 40% requires a digital resolution of about 24 bits, not presently available in process control transmitters with the current power distribution and analog-to-digital technologies.

SUMMARY OF THE INVENTION

In accordance with the present invention, the analog and digital portions of the analog-to-digital convertor are supported by separate dies so that noise is not induced in the analog measurement electronics by the digital system circuit. The operating power for the digital system circuit is decreased, and the power savings may be applied to the analog measurement circuit to increase resolution, and hence rangeability of the transmitter.

A two-wire industrial process control transmitter according to the present invention includes a sensor, at least two integrated circuits, and a level shift circuit. The sensor is responsive to a parameter to provide an analog signal representative of a value of the parameter. The first integrated circuit contains an analog measurement circuit that includes a sensor detection circuit and the analog portion of a digital-to-analog convertor. The analog measurement circuit is coupled to the sensor and is responsive to the analog signal from the sensor to derive a compensated analog signal representative of a value of the sensed parameter. A first power rail is coupled to a source of electric power to supply voltage at a first level to the measurement circuit on the first integrated circuit. A second integrated circuit contains a digital system circuit that includes a modem and the digital portion of the analog-to-digital convertor. The digital portion of the analog-to-digital convertor is responsive to a second compensated analog signal to provide a digital representation of the second compensated analog signal to the modem. The modem is responsive to the digital representation of the second compensated analog signal to transmit a signal representative of the digital representation. A second power rail is coupled to the source of electric power to supply a voltage at a second level to at least a portion of the digital system circuit on the second integrated circuit. A level shifting circuit shifts the voltage level of the first compensated analog signal to the second voltage level to derive the second compensated analog signal.

In one form of the invention, the transmitter is of the 4–20 mA class that draws power from a two-wire communication loop, and the analog measurement circuit and the digital system circuit together draw no more than 18 mW and no more than 3 mA from the loop. A DC-to-DC converter provides the supply voltage at the second level to the second rail and at the first level to the second rail.

In some embodiments of the invention, the analog measurement circuit is operated at a high voltage and the digital circuit is operated at a low voltage, with the high voltage being selected so that the power consumed by the analog measurement circuit is no more than 18 mW minus the power consumed by the digital circuit and the current drawn by the analog measurement circuit is no more than 3 mA minus the current drawn by the digital circuit.

In some embodiments, the digital system circuit is formed in first and second dies and a multichip module stacks the first and second dies. An additional power rail is formed in the stack so that the voltage supplied to the stack is divided among the several dies. Consequently, the portion of the digital circuit on each die is powered by a voltage difference between the module rail and the external rail. A second level shifting circuit shifts the voltage level of data signals between the dies of the stack.

In some embodiments, the analog and digital circuits are operated at different supply voltages so that maximum power is applied to the analog circuits. In other embodiments, the analog circuit and the stack of dies containing the digital circuit are operated at the same supply voltage.

DETAILED DESCRIPTION OF THE ILLUSTRATIVE EMBODIMENTS

The "rangeability," or the ratio of the maximum span to the minimum span, of an industrial process control transmitter is limited by transmitter resolution, which in turn is limited by available power. It is desirable to increase rangeability to reduce manufacturing costs associated with the transmitter. The present invention achieves increased resolution by separating some analog circuits of the transmitter from some digital circuits and re-allocating power saved from the digital circuits to the analog circuits. With more power on the analog circuits, resolution is improved, thus improving rangeability and reducing manufacturing costs.

Figure 1:
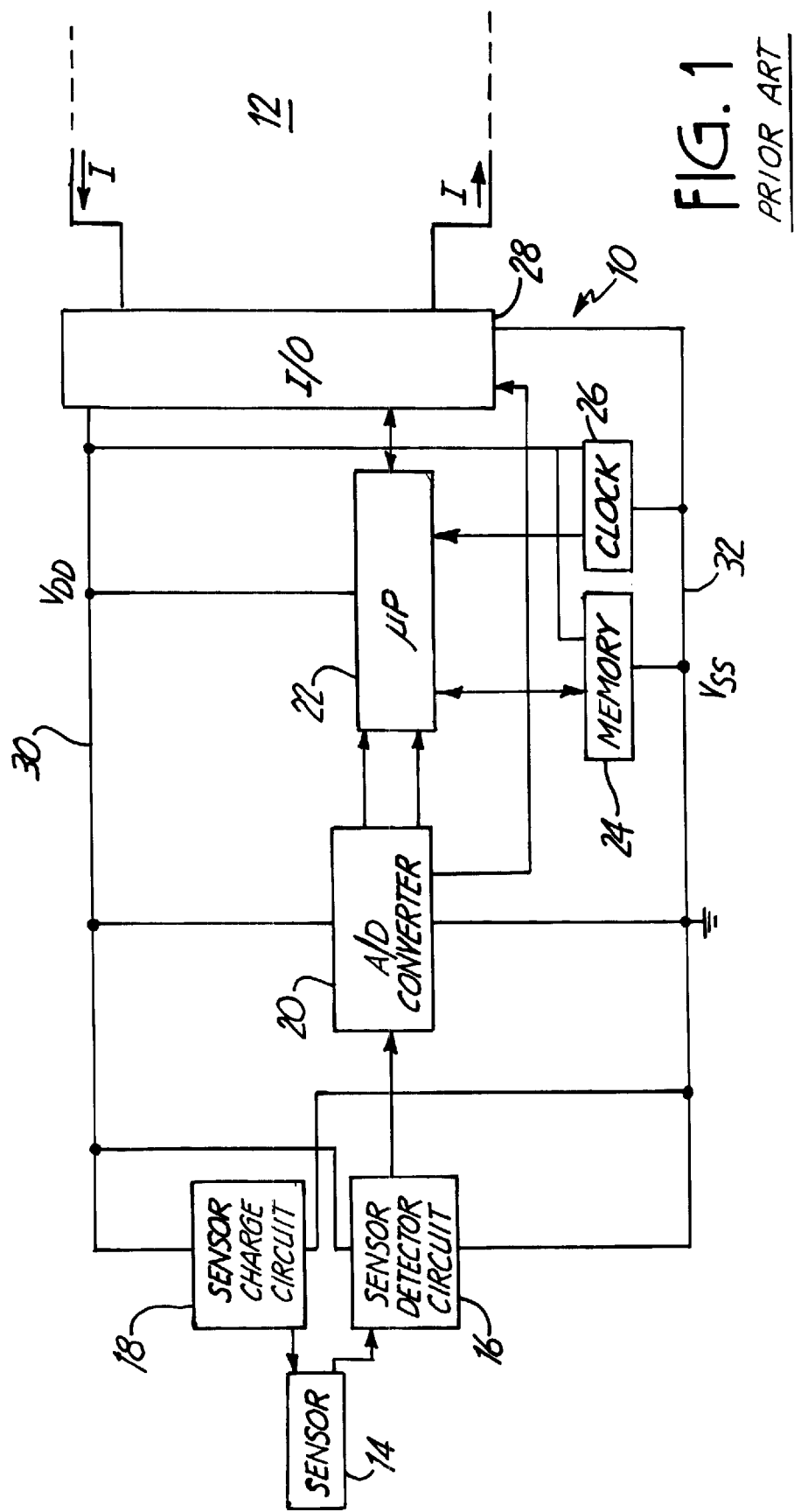
FIG. 1 is a block diagram of the circuits of a prior art industrial process control transmitter.

FIG. 1 is a block diagram of a prior art two-wire industrial process control transmitter 10. Transmitter 10 is coupled to a two-wire process control loop 12 which carries a current I. For example, loop 12 may be a 4–20 mA process control loop which might operate in accordance with one or more of several protocols, including HART®, FieldBus or HSH, each being communication protocols available with process control transmitters from Rosemount, Inc. of Eden Prairie, Minn. Transmitter 10 includes a process variable sensor 14, which couples to a process. Sensor 14 may be, for example, a capacitive sensor that senses a process variable, such as pressure, temperature, pH, flow, etc. Sensor 14 provides an analog output signal representative of the variable being monitored to sensor detection circuit 16. Sensor 14 is charged by charge packets from sensor charge circuit 18. The capacitance of sensor 14 is measured by detection circuit 16. Detection circuit 16 provides an analog signal representative of a value of the process variable to analog-to-digital converter 20 which operates to provide a digitized output representative of the variable to microprocessor 22. More particularly, detection circuit 16 is a charge detection circuit that provides a signal representative of the charge on sensor 14 and provides that signal to an integrator of a sigma-delta analog-to-digital converter 20. Microprocessor 22 receives the digitized signal and operates in accordance with instructions stored in memory 24 and at a rate determined by clock 26. Clock 26 also provides clock signals for the digital portions of other circuits of transmitter 10, including the digital portions of analog-to-digital converter 20 and of input/output circuit 28.

Microprocessor 22 communicates with a central or control station via loop 12 through input/output circuit 28. In this manner, transmitter 10 sends information to the central or control station and receives information from the central or control station. The information may be communicated in a digital format, or in an analog format, or both. Examples of digital formats include binary signals, phase shift key modulated signals (where the phase of the signal represent binary data), or a frequency shift key modulated signal (where the signal frequency represents the binary 1 or 0 value of the binary data). An example of an analog format is to modulate the current I flowing through the loop.

Power for transmitter 10 is typically supplied by the central station via communication loop 12 and input/output circuit 28, although a local power supply may be used in place of, or in addition to, power from loop 12. Transmitter 10 is designed to consume no more than 18 mW and draw no more than 3 mA from loop 12. Consequently, the power requirements of transmitter 10 are limited by these constraints. Input/output circuit 28 derives voltages Vdd and Vss from the loop or from the local supply and supplies power to the circuits of transmitter 10 via power busses 30 and 32. Voltage Vdd on power bus 30 is typically 4.3 volts DC and the voltage Vss on power bus 32 is typically electrical ground.

Transmitter resolution is constrained by noise. The effective noise after sampling of the circuit illustrated in FIG. 1 is represented by $Esh^2 = 4/3kTKampl/Cl \cdot fs\ BW,$ where Kampl is a constant associated with the circuits of transmitter 10, kT is a constant associated with the minimum attainable noise floor of the analog circuits sampling of the signal from sensor 14, BW is the bandwidth, Cl is the capacitance of sensor 14 and fs is the sample rate. For a given bandwidth, the noise is inversely proportional to the capacitance of sensor 14 and the sample rate. Since the other terms of the above equation are fixed, reduction of effective input noise can only be accomplished by increasing capacitance of sensor 14 or the sample rate of the circuit. However, each of these techniques requires an increase in power for the circuit. Since available power is limited by the constraints on loop 12 and transmitter 10, there is seemingly no effective way to increase power to transmitter 10 to decrease noise and thereby increase resolution.

Constraints on the design of industrial process control transmitters limits available power to 18 milliwatts (mW). Noise generated by the digital circuits of the transmitter induced noise on the analog circuits. To support an 18-bit resolution of the transmitter, the analog circuits of prior industrial process control transmitters required a minimum voltage of 4.3 volts at 1.3 mA of current, consuming 5.6 mW of power. The digital circuits operated at a minimum voltage of 3 volts at 1.7 mA of current, consuming 5.1 mW of power. As a result, prior industrial process control transmitters of the prior art have a power consumption floor of 10.7 mW. With 18 mW of power available for the transmitter, the prior transmitters operated at a power efficiency of 59% to achieve 18-bit resolution. Since it is not possible to increase power to the transmitter, it is necessary to either re-allocate power or increase power efficiency to increase the resolution such that greater sensor rangeability is achievable.

Power efficiency can be increased by employing power efficient components in the transmitter, but such components are costly, rendering that option cost prohibitive. Consequently, a first aspect of the present invention is directed to a technique of re-allocating power so that more current is available to the analog circuits without affecting resolution.

Figure 2:
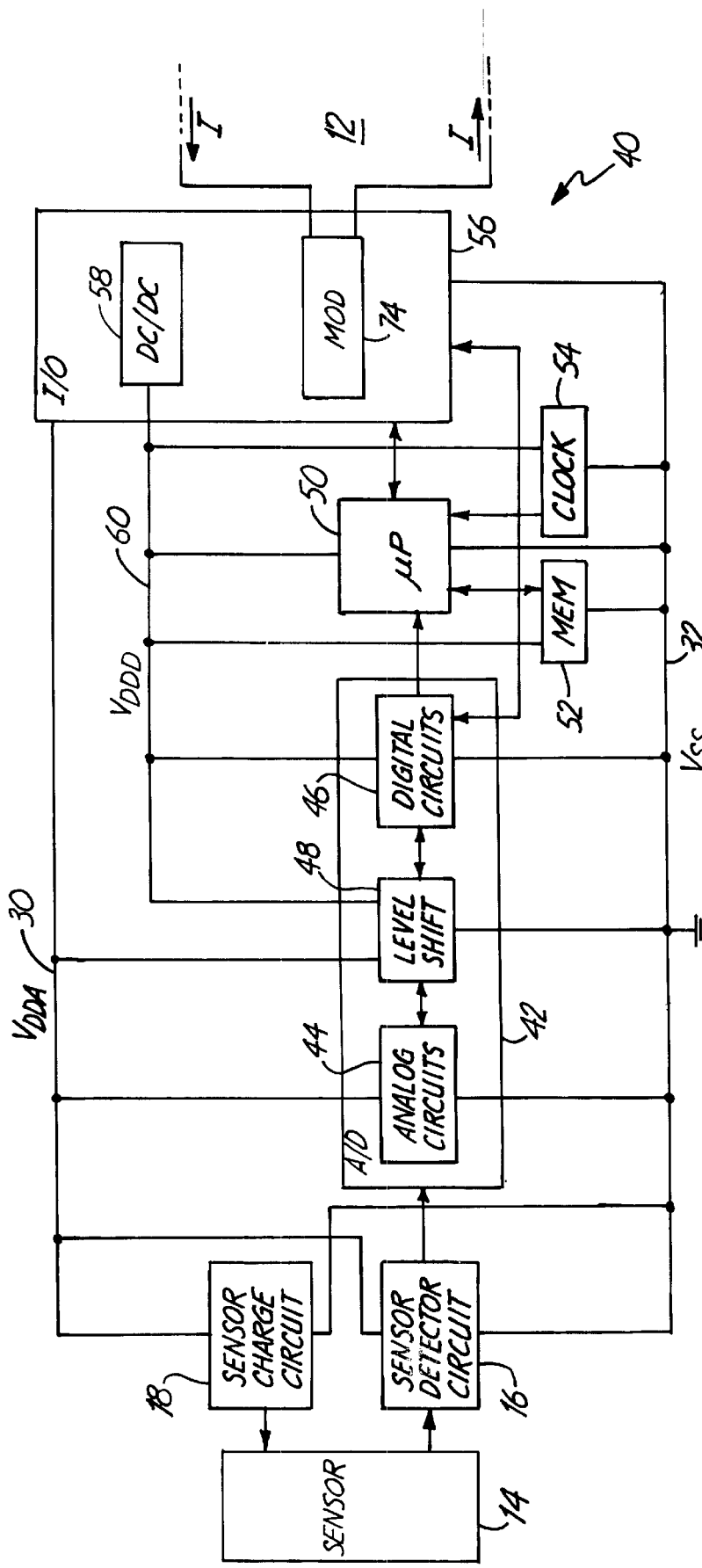
FIG. 2 is a block diagram of the circuits of an industrial process control transmitter according to a first embodiment of the present invention.

FIG. 2 is a block diagram of the equivalent circuit of a transmitter 40 in accordance with a first embodiment of the present invention. Transmitter 40 includes a sensor 14 operated by sensor charge circuit 18. The capacitance of sensor 14 is measured by sensor detection circuit 16. Sensor 14, charge circuit 18 and detection circuit 16 may be identical to those illustrated in FIG. 1. The analog output of sensor detection circuit 16 is representative of a value of the variable being monitored and is provided as an input to analog-to-digital converter 42. As will be explained in greater detail in connection with FIG. 3, analog-to-digital converter 42 includes analog circuits 44, digital circuits 46 and a level shift circuit 48. The output of digital circuit 46 is a digitized signal representative of the analog signal input to converter 42 and is provided as an input to microprocessor 50. Memory 52 is coupled to microprocessor 50 in the same manner that memory 24 is connected to microprocessor 22 in FIG. 1. A portion of memory 52 is an Electronically Erasable Programmable Read Only Memory (EEPROM) that serves as a non-volatile memory, but is programmable on command from the central station operating through loop 12. Likewise, clock 54 is connected to microprocessor 52, digital circuits 46 of converter 42 and the digital portions of input/output circuit 56 in the same manner that clock 26 is connected to microprocessor 22 and the digital circuits of converter 42 and input/output circuit 28 in FIG. 1. Microprocessor 50 provides an output to input/output circuit 56, which is connected to loop 12.

Figure 3:
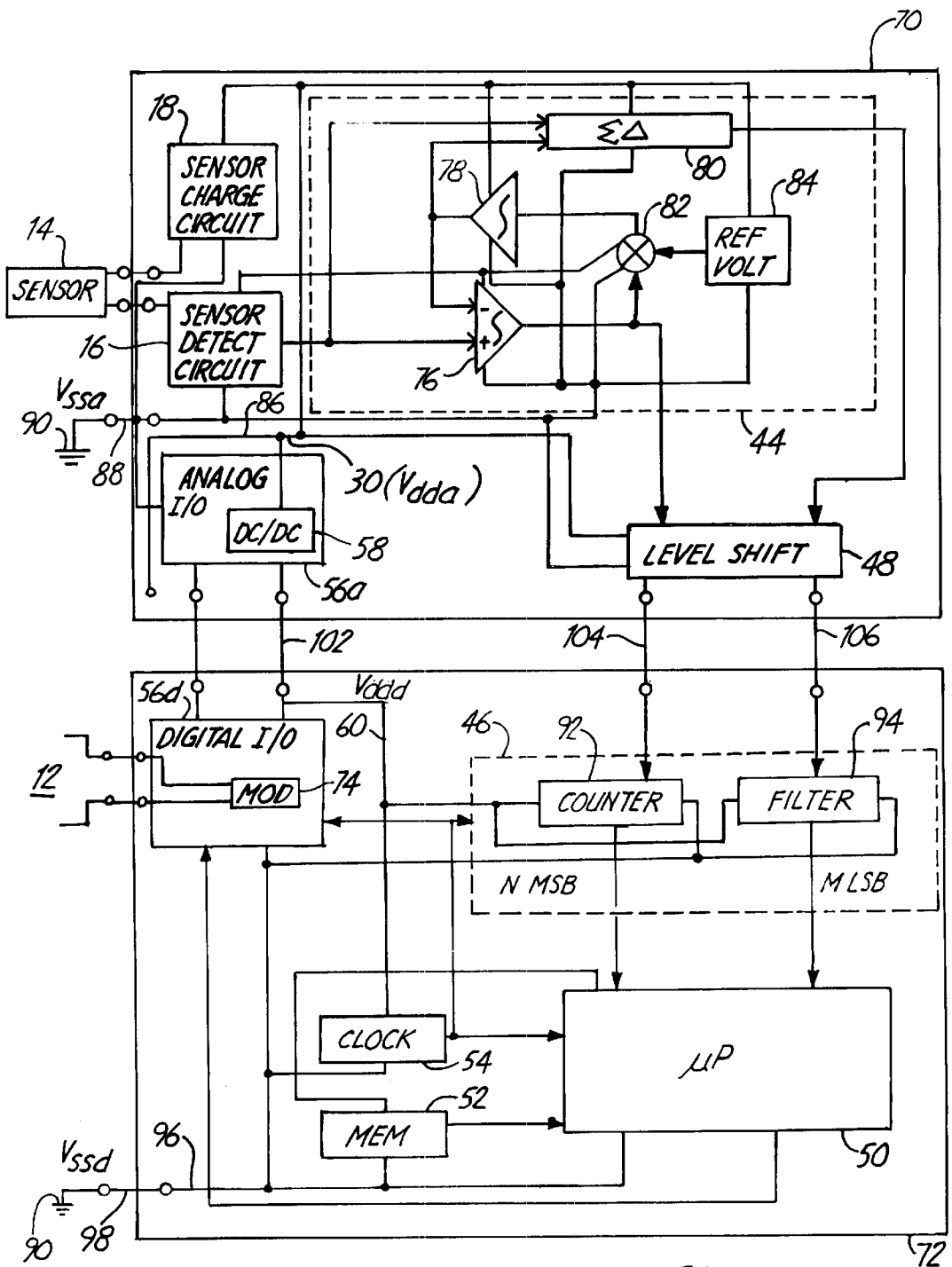
FIG. 3 is a physical representation of the circuits illustrated in FIG. 2.

As in the case of the circuit illustrated in FIG. 1, input/output circuit 56 provides a power bus 30 to supply power at voltage Vdda to sensor charge circuit 18, sensor detect circuit 16, the analog circuits 44 of converter 42 and level shift circuit 48. Input/output circuit 56 also includes DC-to-DC converter 58 arranged to provide power on bus 60 at a voltage level Vddd. Bus 60 is connected to level shift circuit 48, digital circuits 46, microprocessor 50, memory 52 and clock 54. Bus 32 is a DC common power bus providing a voltage Vss, which is typically electrical ground. Bus 32 is coupled to the analog and digital circuits. As shown in FIG. 3, the analog circuits are on an analog integrated circuit chip 70 and the digital circuits are on digital integrated circuit chip 72. Because the analog and digital circuits are on separate chips (also called integrated circuit dies or silicon substrates), noise generated by the digital circuits is not induced into the analog circuits and noise in the analog circuits is significantly reduced. The two silicon substrates are electrically isolated so that noise does not pass through the silicon from the analog circuits to the digital circuits.

If Vdda is 12 volts DC, the analog circuits could be operated at less than 0.5 mA without altering the power consumption (5.6 mW) of the analog circuits. At the same time, if Vddd reduced to 1.8 volts (equal to two diode drops of a semiconductor), the power consumption of the digital circuits would be reduced to 3.1 mW. Hence, the transmitter power consumption would be reduced to 8.7 mW without affecting performance. More importantly, current consumption of the transmitter would be reduced to 2.2 mA, 0.8 mA below the maximum current draw. The present invention takes the 0.8 mA current and reapplies it to the analog circuits, thereby improving resolution of the analog circuits. Consequently, instead of operating at 0.5 mA at 12 volts, the present invention would operate the analog circuits at 1.3 mA at 12 volts, consuming 15.6 mW of power. However, because the 15.6 mW power consumption of the analog circuit causes the transmitter to exceed the allowed power consumption of 18 mW, the current actually available to the analog circuits is 1.25 mA. Consequently, the transmitter of FIG. 2 operates at 2.95 mA and 18.0 mW. The increased voltage level on the analog circuits does not affect noise induced into the digital circuits because the digital circuits are on a separate chip.

Level shift circuit 48 serves to shift data signals between the analog circuits 44 and digital circuits 46 of analog-to-digital converter 42. More particularly, level shift circuit 48 shifts data signals between analog circuits 44 and digital circuits 46 between the 12 volt operation of analog circuits 44 and the 1.8 volt operation of digital circuits 46.

FIG. 3 illustrates the layout of two integrated circuit chips 70 and 72. Charge circuit 18, detection circuit 16, analog circuits 44, level shift circuit 48 and the analog portions 56a of the input/output circuit, including DC-to-DC converter 58 are formed on integrated circuit chip 70. Digital circuits 46, microprocessor 50, including memory 52 and clock 54, and the digital portions 56d of the input/output circuit, including modem 74 are formed on integrated circuit chip 72. The elements of analog circuit 44 of analog-to-digital converter 42, including integrator 76, integrator 78, sigma-delta converter 80, switch 82 and reference voltage source 84 are coupled between bus 30 and bus 86, and receive power based on the voltage difference between Vdda and Vssa. Bus 86 is coupled through connector 88 to electrical ground, or DC common, at 90. Similarly, microprocessor 50, memory 52, clock 54, the digital portions 56d of the input/output circuit, including modem 74, digital counter 92 and digital filter 94 are coupled between bus 60 and bus 96, and receive power based on the voltage difference between Vddd and Vssd. Bus 96 is coupled through connector 98 to ground 90. Thus, busses 86 and 96 represent bus 32 shown in FIG. 2, and voltage levels Vssd and Vssa are electrical ground (DC. common) and represent Vss shown in FIG. 2. DC-to-DC converter 58 has its input connected to bus 30, which serves as the highest voltage power bus in the system. In a 4–20 mA process control transmitter, this voltage may be as high as 12 volts. Converter 58 converts the 12-volt power on bus 30 to a 1.8-volt power coupled through connector 102 to bus 60. Level shifter 48 is coupled by connectors 104 and 106 to digital counter 92 and digital filter 94, respectively.

Those skilled in the art will appreciate that the analog-to-digital converter circuit composed of analog circuits 44 and digital circuits 46 illustrated in FIG. 3 is typically a sigma-delta analog-to-digital converter, whose operation is shown and described in Gaboury et al., U.S. Pat. No. 6,005,500, granted Dec. 21, 1999 to the same Assignee as the present invention. More particularly, the sigma-delta circuit includes an analog portion 44 that derives a compensated analog signal, and a digital portion 46. Sigma-delta circuits, also known as delta-sigma, $\Sigma\text{-}\Delta$ and $\Delta\text{-}\Sigma$ circuits, generate an alternating polarity balancing current to an integrator under control of a clocked controller, and are thus distinguished from other rebalancing analog-to-digital converters. The principal difference of the analog-to-digital converter circuit illustrated in FIG. 3 over that illustrated in the aforementioned Gaboury et al. patent is that the present invention separates the analog and digital portions of the circuit to separate integrated circuit chips and operates the digital circuits on chip 72 at 1.8 volts. Level shift circuit 48 shifts the signal level of compensated analog data signals to derive shifted compensated analog data signals so that the digital portion 46 of the circuit operates on a correct signal level. The power consumption of the 1.8-volt digital circuits is about 3.1 mW, representing a reduction of power consumption 2.0 mW from that of the transmitter shown in FIG. 1, and a 40% reduction in power consumed by the digital circuits.

The reduction in current the 1.8-volt digital circuits may be applied to the analog circuits. The additional current, coupled with the high voltage to the analog chip, increases the resolution of the analog chip to support a 24-bit resolution. Consequently, the transmitter may be operated with a greater number of spans with smaller span ranges, thereby increasing rangeability. Hence, the rangeability of the transmitter of FIGS. 2 and 3 is greatly increased over that of FIG. 1.

Figure 4:
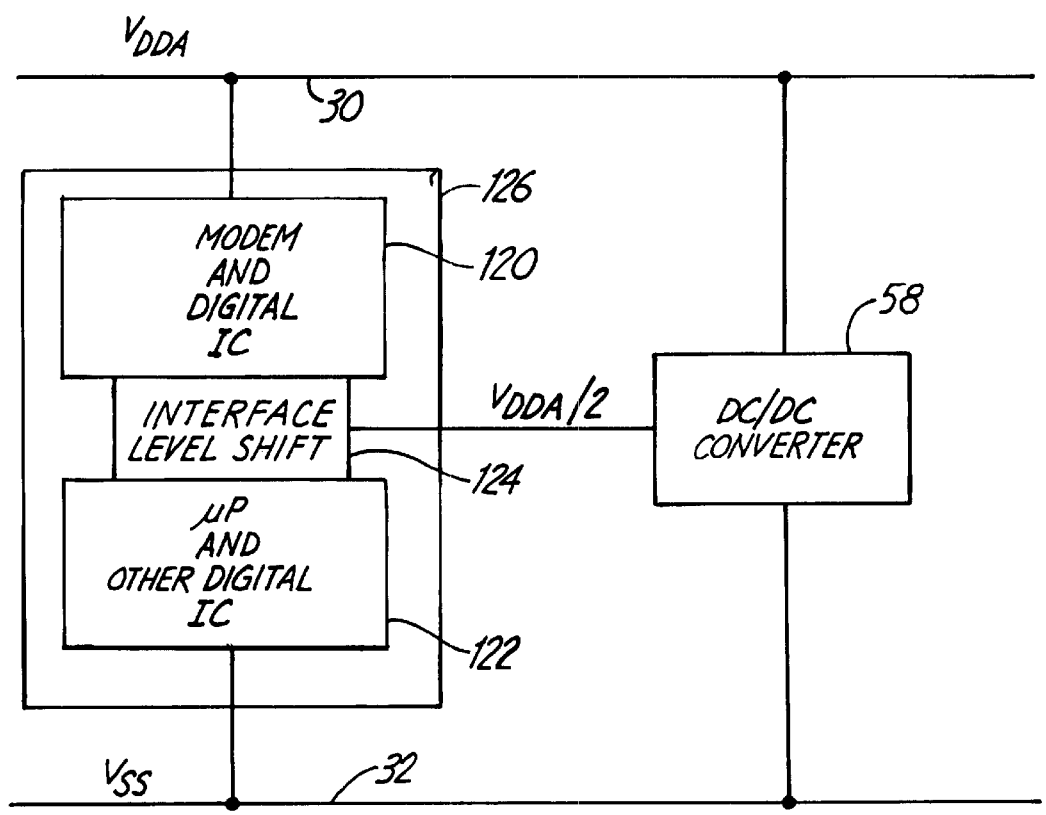
FIG. 4 is illustrates the physical layout of the digital circuits of an industrial process control transmitter according to a second embodiment of the present invention.

FIG. 4 illustrates a multichip module for use in place of chip 72 illustrated in FIG. 3. In FIG. 4, modem 74 and digital circuits 46 of the analog-to-digital converter are formed in a first integrated circuit chip 120, and microprocessor 50, memory 52, clock 54 and remaining digital portions 56d of input/output circuit are formed in integrated circuit chip 122. Interface 124 forms an interface level shift between the two chips 120 and 122. Chips 120 and 122 and interface 124 are supported on a common substrate 126. The positive power side of chip 120 is coupled to bus 30, and the negative power side of chip 122 is coupled to bus 32. Bus 30 is coupled to Vdda (e.g., +4.3 volts), and bus 32 is coupled to Vss (e.g., ground). DC-to-DC converter 58 is coupled between busses 30 and 32 to supply a voltage of Vdda/2 (i.e., +2.15 volts) to interface 124. Interface 124 provides a power interface between chips 120 and 122 at one-half of the voltage level of Vdda (Vdda/2). Consequently, the voltage supplied to modem 74 and digital circuits 46 of the analog-to-digital converter is Vdda minus Vdda/2, and the voltage supplied to microprocessor 50 and other digital electronics equals Vdda/2 minus Vss. With Vdda at +4.3 volts and Vss at ground, the digital electronics of each digital chip is powered at 2.15 volts. The level shift circuit of interface 124 also serves to add or subtract Vdda/2 (e.g., 2.15 volts) to data signals between the chips 122 and 120.

Figure 5:
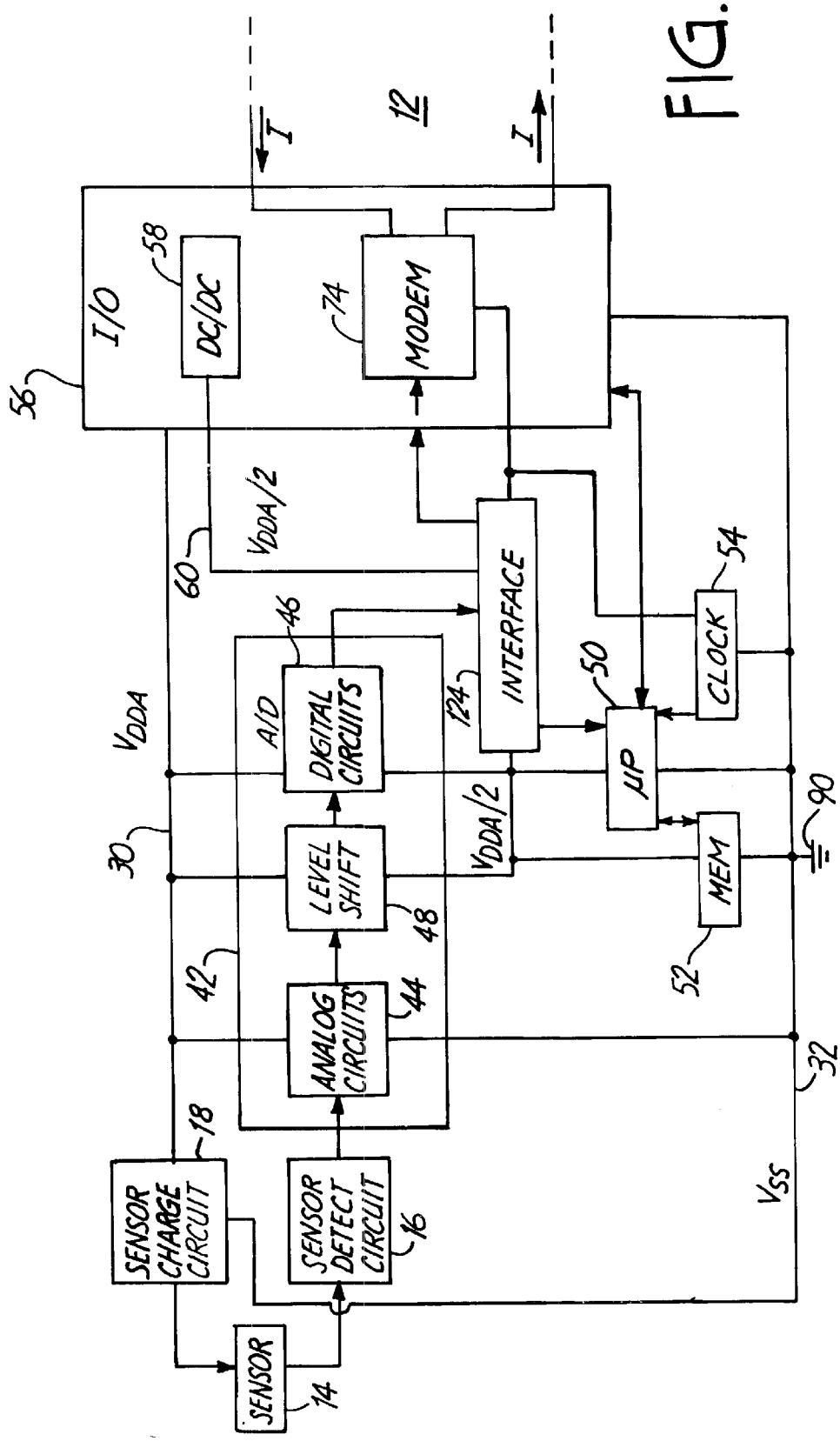
FIG. 5 is a block diagram of the circuits of the industrial process control transmitter of the second embodiment of the present invention.

FIG. 5 illustrates the circuit diagram of a transmitter employing the multichip module of FIG. 4 in a manner similar to that of FIG. 2. DC-to-DC converter 53 supplies a +2.15 volt power level (Vdda/2) to bus 60, while a 4.3 volt power level (Vdda) is applied to bus 30. Consequently, bus 60 is the positive power bus supplying power at +2.15 volts via interface 124 to modem 74 in input/output circuit 56, to level shift circuit 48 to microprocessor 50, memory 52, clock 54 and the other digital circuits 56d of input/output circuit 56 on chip 122. Digital circuits 46 of analog-to-digital converter 42 on chip 120 and analog circuits 44 on chip 70 (FIG. 3) receive +4.3 volts from Vdda on bus 30. Interface 124 is electrically at Vdda/2 and forms the low voltage, or more negative, power bus for modem 74, digital circuits 46 and level shifter 48 on chip 120. Bus 32 is the negative power bus for chip 122. The result of the circuit illustrated in FIGS. 4 and 5 is that the current drawn by the stacked integrated circuits chips on the digital electronics is the maximum current drawn by either of the two chips. Consequently, instead of the digital circuits drawing 1.7 mA current, as in the case of the circuit illustrated in FIG. 2, the digital circuits of FIGS. 4 and 5 draw about 700 $\mu$A (0.7 mA) of current at 2.5 mW. At the same time, the analog circuit draws 1.3 mA at 5.6 mW. By re-allocating 1.0 mA of current to the analog circuits, the power consumption of the analog circuit will be 10 mW, resulting in a 12.5 mW power consumption for the transmitter.

The principal advantage of the transmitter of FIGS. 4 and 5 over that of FIGS. 2 and 3 is that the voltage boost required for Vdda in FIGS. 2 and 3 is not required for the transmitter of FIGS. 4 and 5. The transmitter of FIGS. 4 and 5 consumes 12.5 mW of power, meaning that the power efficiency (power used to available power) is 69%, compared to a 59% power efficiency of the transmitter of FIG. 1.

If desired, the dual digital chip feature of the transmitter of FIGS. 4 and 5 might be combined with the voltage boost feature of the transmitter of FIGS. 2 and 3 to achieve even greater power for the analog circuits. Hence, with the digital circuits consuming 2.5 mW, the Vdda voltage on bus 30 could be increase to as high as 6.5 volts so that power in the analog circuits is maximized to about 15.5 mW.

Figure 6:
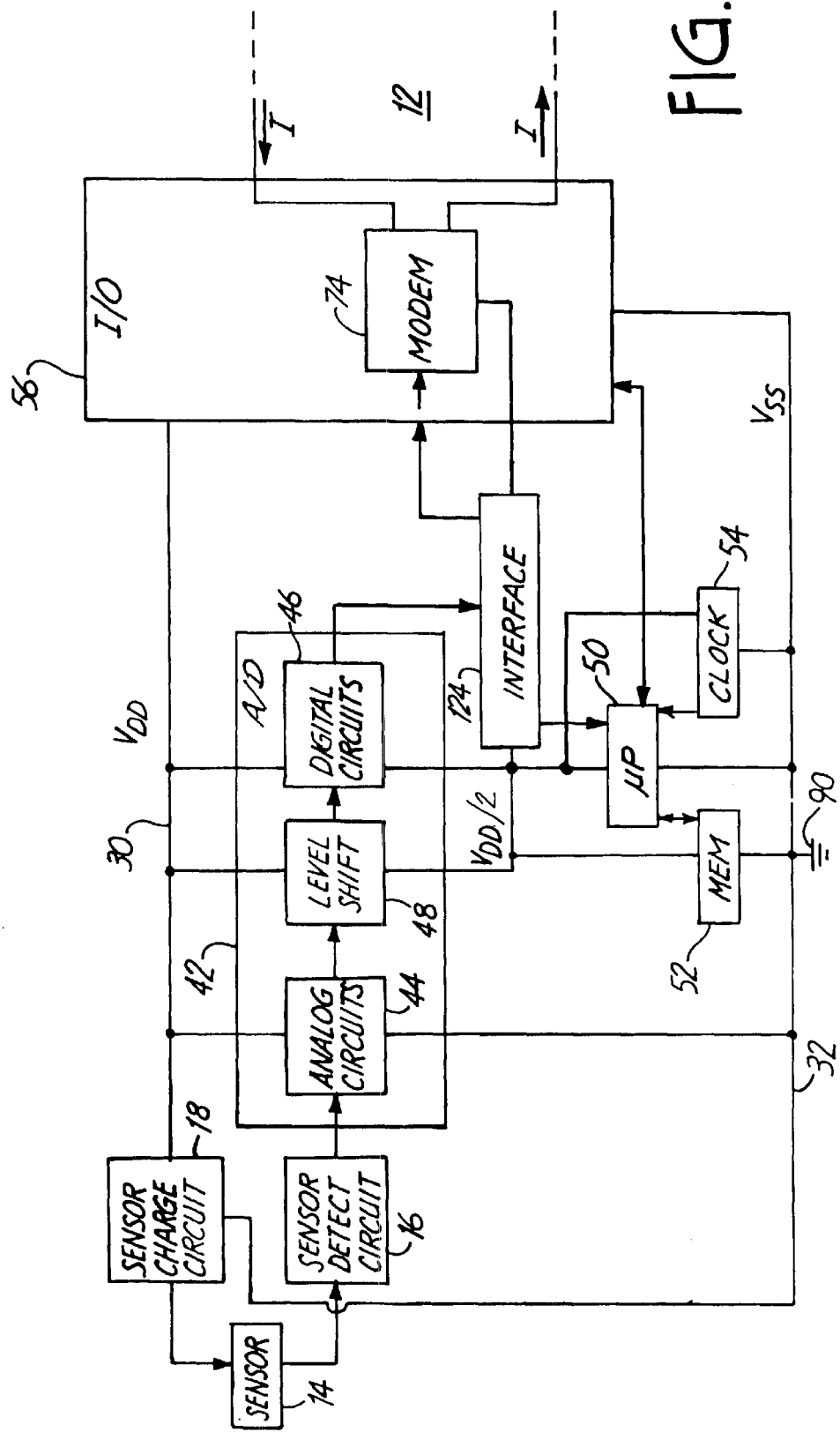
FIG. 6 is a block diagram of the circuits of an industrial process control transmitter according to a third embodiment of the present invention.

FIG. 6 illustrates a modification of the embodiment of FIGS. 4 and 5 in that DC-to-DC converter 58 is eliminated and the voltage on bus Vdd is about 4.3 volts and is supplied to both the analog chip and the stacked digital chips. Bus 30 supplies power at Vdd to the analog circuits, as in the case of the prior embodiments, and also to those digital circuits that were connected to bus 60 in the embodiment of FIGS. 4 and 5. Consequently, bus 30 is the positive power bus supplying power at +4.3 volts to modem 74 in input/output circuit 56 and to level shift circuit 48 and digital circuits 46 of analog-to-digital converter 42 on chip 120, as well as to the analog circuits 44, detection circuit 16, charge circuit 18 and the analog portions 56a of the input/output circuit. As in the case of the embodiment of FIGS. 4 and 5, level shift interface 124 provides a voltage Vdd/2 (e.g., +2.15 volts), as well as level shifting between the digital circuits. Consequently, interface 124 forms the low voltage, or more negative, power bus for modem 74,. digital circuits 46 and level shifter 48 on chip 120 and forms the positive power bus to microprocessor 50, memory 52, clock 54 and the other digital circuits 56d of input/output circuit 56 on chip 122. Bus 32 is the negative power bus for chip 122 as well as for the analog circuits of the transmitter.

The principal advantage of the circuit illustrate in FIG. 6 is the elimination of the DC-to-DC converter. Moreover, with 4.3 volts available for the digital circuits (2.15 volts for each digital chip 120 and 122), power efficiency is increased to 72%.

The present invention thus provides a transmitter that permits increased resolution and decreased noise without affecting available power and without changing the capacitance of the sensor or the sample rates of the transmitter. The circuit separates the analog and digital portions of the transmitter to increase resolution and provides power tiers for the digital circuits to more efficiently use the power. With the increased resolution to as high as 24 bits, the number of spans of the transmitter may be decreased by as much as 40%, resulting in increased rangeability and decreased manufacturing costs.

Although the present invention has been described with reference to preferred embodiments, workers skilled in the art will recognize that changes may be made in form and detail without departing from the spirit and scope of the invention.

What is claimed is:

1. An industrial process control transmitter adapted to be coupled to a two-wire loop, comprising:
    a sensor;
    a first integrated circuit chip containing:
        a first power rail energized from the two-wire loop to provide a first voltage level, and
        an analog measurement circuit coupled to the sensor and powered by the first voltage level, the analog measurement circuit includes a sensor detection circuit and analog portions of an analog-to-digital convertor to derive a first compensated analog signal representative of a sensed parameter;
    a second integrated circuit chip, separate from the first integrated circuit chip containing:
        a digital system circuit that includes digital portions of the analog-to-digital convertor, the digital portions of the analog-to-digital convertor responsive to a second compensated analog signal, and
        a second power rail energized from the two-wire loop providing a second voltage level lower than the first level, the second power rail powering at least a portion of the digital system circuit; and
    a level shifting circuit shifting a voltage level of the first compensated analog signal to the second voltage level to derive a second compensated analog signal.

2. The transmitter of claim 1, wherein the digital system circuit on the second integrated circuit chip includes a modem to transmit a signal representative of the digital representation.

3. The transmitter of claim 1, wherein the transmitter is of the 4–20 mA class, and the analog measurement circuit and the digital system circuit together draw no more than 18 mW and no more than 3 mA from the loop, the transmitter including
    a DC-to-DC converter energizing the second power rail at a second voltage level no more than two diode drops and energizing the first power rail at a first voltage level so that the power consumed by the analog measurement circuit is no more than 18 mW minus the power consumed by the first integrated circuit and the current drawn by the analog measurement circuit is no more than 3 mA minus the current drawn by the digital system circuit.

4. The transmitter of claim 3, wherein the digital system circuit on the second integrated circuit chip includes a modem to transmit a signal representative of the digital representation.

5. The transmitter of claim 1, including a common power rail coupled to the first and second integrated circuit chips and energized by the two-wire loop to provide a common voltage level, the second integrated circuit chip including:
    first and second dies each forming respective portions of the digital system circuit,
    a multichip module stacking the first and second dies,
    the first power rail coupled to the first die to supply the first voltage level to the portion of the digital system circuit on the first die,
    the common power rail coupled to the second die to supply the common voltage level to the portion of the digital system circuit on the second die, and
    an interface coupled to the first and second dies, the interface including the second power rail to supply the second voltage level to the portions of the digital system circuit on the first and second dies, the second voltage level being between the first and common voltage levels,
    whereby the portion of the digital circuit on the first die is powered by a voltage difference between the first and second voltage levels and the portion of the digital circuit on the second die is powered by a voltage difference between the second and common voltage levels.

6. The transmitter of claim 5, including a modem on one of the dies to transmit a signal representative of the digital representation.

7. The transmitter of claim 6, including a second level shifting circuit for shifting a voltage level of data signals between the first and second dies.

8. The transmitter of claim 5, including a second level shifting circuit for shifting a voltage level of data signals between the first and second dies.

9. The transmitter of claim 5, wherein the transmitter is of the 4–20 mA class, and the analog measurement circuit and the digital system circuit together draw no more than 18 mW and no more than 3 mA from the loop, the transmitter including
    a DC-to-DC converter on the first chip and connected to the first and second power rails to energize the second power rail at the second voltage level no more than two diode drops below the first voltage level so that the power consumed by the analog measurement circuit is no more than 18 mW minus the power consumed by the digital system circuit and the current drawn by the analog measurement circuit is no more than 3 mA minus the current drawn by the first and second dies.

10. The transmitter of claim 9, including a modem on one of the dies to transmit a signal representative of the digital representation.

11. The transmitter of claim 10, including a second level shifting circuit for shifting a voltage level of data signals between the first and second dies.

12. The transmitter of claim 9, including a second level shifting circuit for shifting a voltage level of data signals between the first and second dies.

13. An industrial process control transmitter adapted to be coupled to a two-wire loop, comprising:
    a sensor;

a first integrated circuit on a first chip comprising an analog measurement circuit coupled to the sensor, the analog measurement circuit includes a sensor detection circuit and analog portions of an analog-to-digital convertor to derive a first compensated analog signal representative of a value of a sensed parameter;

a second integrated circuit comprising:
- a first die that includes at least digital portions of the analog-to-digital convertor responsive to a second compensated analog signal,
- a second die that includes at least a modem responsive to the digital portions of the analog-to-digital converter to transmit a signal representative of the sensed parameter,
- a multichip module stacking the first and second dies, and
- an interface power rail between the first and second dies;

a first power rail energized by the two-wire loop to provide a first voltage level to the first die and to the first integrated circuit;

a second power rail energized by the two-wire loop to provide a common voltage level to the second die and to the first integrated circuit;

a first level shifting circuit for shifting a voltage level of the first compensated analog signal to derive the second compensated analog signal, and a second level shifting circuit for shifting a voltage level of data signals between the first and second dies.

14. The transmitter of claim 13, wherein the interface power rail supplies a second voltage level between the first and common voltage levels, whereby the first die is powered by a voltage difference between the first and second voltage levels and the second die is powered by a voltage difference between the second and common voltage levels.

15. The transmitter of claim 14, wherein transmitter is of the 4–20 mA class, and the analog measurement circuit and the digital system circuit together draw no more than 18 mW and no more than 3 mA from the loop.

16. The transmitter of claim 13, wherein transmitter is of the 4–20 mA class, and the analog measurement circuit and the digital system circuit together draw no more than 18 mW and no more than 3 mA from the loop.

17. The transmitter of claim 1, wherein the level shifting circuit is on the first chip.

* * * * *